United States Patent
Fransson et al.

(10) Patent No.: US 12,088,909 B2
(45) Date of Patent: Sep. 10, 2024

(54) WARNING LIGHT THWART DETECTION FOR RECORDING DEVICES

(71) Applicant: GOOGLE LLC, Mountain View, CA (US)

(72) Inventors: Nils Johan Fransson, Kitchener (CA); Arnett Ryan Weber, Waterloo (CA); Erturk Kocalar, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 17/807,062

(22) Filed: Jun. 15, 2022

(65) Prior Publication Data
US 2023/0412915 A1 Dec. 21, 2023

(51) Int. Cl.
| | |
|---|---|
| *H04N 23/63* | (2023.01) |
| *G01J 1/44* | (2006.01) |
| *G02B 6/00* | (2006.01) |
| *G02B 27/01* | (2006.01) |
| *H04N 23/57* | (2023.01) |
| *H04N 23/667* | (2023.01) |

(52) U.S. Cl.
CPC ............ *H04N 23/634* (2023.01); *G01J 1/44* (2013.01); *G02B 6/00* (2013.01); *G02B 27/0172* (2013.01); *H04N 23/57* (2023.01); *H04N 23/667* (2023.01); *G02B 2027/0138* (2013.01); *G02B 2027/014* (2013.01)

(58) Field of Classification Search
CPC .... H04N 23/634; H04N 23/57; H04N 23/667; G01J 1/44; G02B 6/00; G02B 27/0172; G02B 2027/0138; G02B 2027/014
See application file for complete search history.

(56) References Cited

U.S. PATENT DOCUMENTS

| | | | |
|---|---|---|---|
| 9,239,949 B2 | 1/2016 | Jung et al. | |
| 9,345,097 B1 | 5/2016 | Ho et al. | |
| 9,974,135 B1 | 5/2018 | Nelson et al. | |
| 10,367,986 B1 | 7/2019 | Berenberg et al. | |
| 10,608,409 B1 * | 3/2020 | Gibson | G02B 27/0172 |
| 2006/0104616 A1 | 5/2006 | Shellshear | |

(Continued)

FOREIGN PATENT DOCUMENTS

WO 2013144966 A1 10/2013

OTHER PUBLICATIONS

"Cross-Talk Effects in OLED Displays", Software Evaluation; https://www.fluxim.com/quantifying-electro-optical-cross-talk-effects-in-displays, Feb. 21, 2022, 9 pages.

(Continued)

*Primary Examiner* — Padma Haliyur
(74) *Attorney, Agent, or Firm* — Brake Hughes Bellermann LLP

(57) ABSTRACT

Described techniques enable thwart detection for warning lights associated with recording devices, such as cameras. A warning light may be used to alert bystanders that a recording is in progress, but an operator of a recording device may attempt to circumvent the warning light by obstructing the warning light. A lightpipe or other light guiding element may be used to guide a redirection of the warning light to a light sensor. Then, when the redirection exceeds a threshold, which may be determined based in part on a baseline level of ambient light, recording operations of the recording device may be automatically deactivated.

17 Claims, 15 Drawing Sheets

(56) References Cited

U.S. PATENT DOCUMENTS

| | | | |
|---|---|---|---|
| 2010/0226017 A1* | 9/2010 | Spaller | G02B 27/0172 |
| | | | 359/630 |
| 2011/0280551 A1 | 11/2011 | Sammon | |
| 2013/0155236 A1 | 6/2013 | Ramdeo | |
| 2013/0221851 A1 | 8/2013 | Coates | |
| 2014/0043440 A1 | 2/2014 | Tang et al. | |
| 2015/0049487 A1* | 2/2015 | Connor | F21V 33/0076 |
| | | | 362/277 |
| 2015/0235048 A1 | 8/2015 | Balusu et al. | |
| 2015/0323990 A1 | 11/2015 | Maltz | |
| 2016/0050037 A1 | 2/2016 | Webb | |
| 2016/0307082 A1 | 10/2016 | Wurmfeld et al. | |
| 2016/0318020 A1 | 11/2016 | Quake et al. | |
| 2018/0066975 A1 | 3/2018 | Viswanathan | |
| 2019/0158789 A1 | 5/2019 | Snyder et al. | |
| 2021/0020200 A1 | 1/2021 | Lu | |
| 2022/0094833 A1* | 3/2022 | Vedula | G06F 21/86 |
| 2022/0156485 A1 | 5/2022 | Tzvieli et al. | |
| 2022/0172700 A1 | 6/2022 | Xiong et al. | |
| 2022/0198140 A1 | 6/2022 | Trim et al. | |
| 2022/0217308 A1* | 7/2022 | Mont-Reynaud | H04N 23/611 |
| 2022/0326426 A1* | 10/2022 | Eisenfeld | G02B 6/0006 |
| 2022/0390754 A1* | 12/2022 | Grabarnik | G02B 3/08 |

OTHER PUBLICATIONS

"Light Pipe Design Guide", Fundametals of LED Light Pipes—VCC; https://vcclite.com/light-pipe-design-guide/, 42 bages.

Braun, "Crosstalk in Passive Matrix Polymer LED Displays", Elsevier; Synthetic Metals 92, 1998, pp. 107-113.

George, "Spyware Alert! These Glasses Have a Built-In Camera to Record Everything You See", Digital Camera World; The Home of Digital Photography, May 14, 2020, 9 pages.

Koelle, et al., "Beyond Led Status Lights—Design Requirements of Privacy Notices for Body-Worn Cameras", TEI '18, Stockholm, Sweden, Mar. 18-21, 2018, 11 pages.

Portnoff, et al., "Somebody's Watching Me? Assessing the Effectiveness of Webcam Indicator Lights", CHI 2015, Seoul, Republic of Korea, Apr. 18-23, 2015, 10 pages.

Dietz, et al., "LEDs as sensors", SIGGRAPH '19 Studio, Conference Paper, Jul. 2019, 3 pages.

* cited by examiner

WARNING LIGHT THWART DETECTION FOR RECORDING DEVICES

TECHNICAL FIELD

This description relates to warning lights used to address privacy concerns associated with using recording devices.

BACKGROUND

Devices capable of recording audio and/or video may be small, convenient, and inconspicuous, particularly when integrated into another device(s). For example, a small camera may be integrated into glasses or other head-mounted devices (HMDs), or into other wearable devices. Moreover, many such devices may be controlled by a user with discreet techniques that may not easily observable or noticeable by bystanders. For example, HMDs may be controlled by gestures or blinking.

As a result, it may be technically feasible to capture audio and/or video of nearby persons, in a manner that is not noticeable or detectable by the persons. However, doing so may violate privacy rights, legal requirements, and/or social norms related to unauthorized audiovisual capturing.

As a result, some devices use warning lights that are activated in conjunction with a recording device. Such warning lights may be positioned and configured to be visible to nearby persons when the associated recording device is active.

SUMMARY

In a general aspect, a device may include a recording device and a warning light configured to be activated in conjunction with recording operations of the recording device. The device may include a light sensor configured to detect redirection of the warning light when the warning light is at least partially obscured, and a control circuit configured to deactivate the recording operations in response to the redirection.

According to another general aspect, a computer program product may be tangibly embodied on a non-transitory computer-readable storage medium and may include instructions. When executed by at least one computing device, the instructions may be configured to cause the at least one computing device to activate a warning light of a device in conjunction with activating recording operations of a recording device of the device, detect redirection of the warning light at a light sensor of the device when the warning light is at least partially obscured, and deactivate the recording operations in response to the redirection.

According to another general aspect, a method may include activating a warning light of a device in conjunction with activating recording operations of a recording device of the device. The method may include detecting redirection of the warning light at a light sensor of the device when the warning light is at least partially obscured. The method may include deactivating the recording operations in response to the redirection.

The details of one or more implementations are set forth in the accompanying drawings and the description below. Other features will be apparent from the description and drawings, and from the claims.

DETAILED DESCRIPTION

Described systems and techniques enable thwart detection of warning lights used to warn bystanders that a recording device is in use. Accordingly, privacy of such bystanders may be protected, and illegal or illicit use of the recording device may be prevented, e.g., by deactivation of recording operations of the recorded device while the thwarting of a warning light is detected.

As referenced above, warning lights may be used to alert bystanders that an audio and/or video recording is actively being captured, when the corresponding recording device may not be visible or otherwise detectable to the bystanders. Such warning lights therefore enable the bystanders, e.g., to request cessation of the recording, to leave the area, to modify their behavior, or otherwise respond in a desired or available manner to an unwanted recording.

It is possible that users or operators of such devices, or other persons, may seek to thwart the intended effects of such warning lights. For example, users may block a warning light by placing a finger, tape, or other obscuring object over the warning light, so that the warning light is no longer visible to bystanders. Similarly, users may make a marking that covers the warning light, or otherwise at least partially obscure the warning light. In such scenarios, and similar scenarios, the risk of undesired recordings increases, and the above-referenced privacy concerns are heightened.

Figure 1:
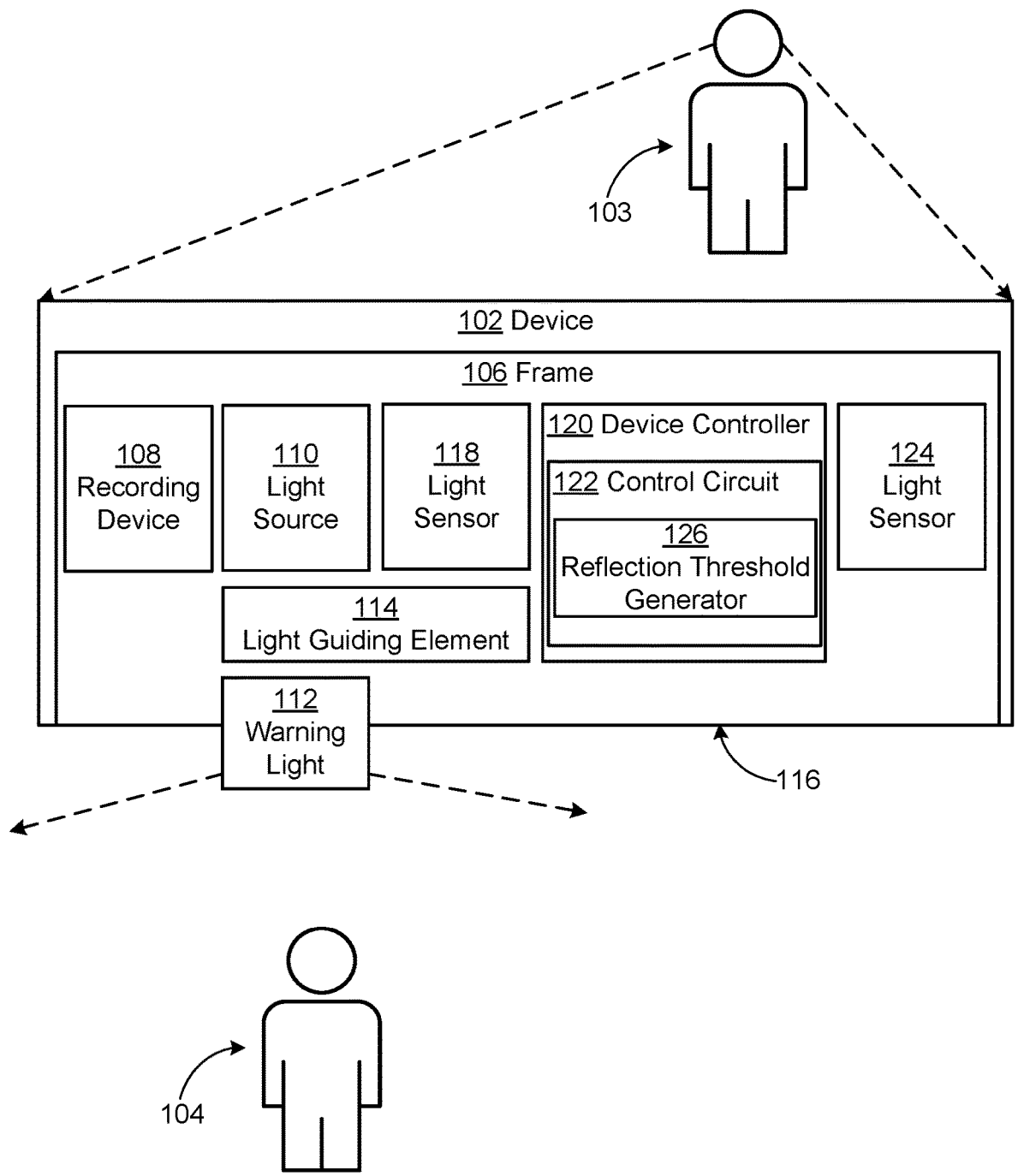
FIG. 1 is a block diagram of a device with warning light thwart detection for recording devices.

To avoid the possibility that users of such recording devices, or other entities, may seek to thwart the intended effects of such warning lights, described techniques utilize a light sensor, such as an ambient light sensor, to detect reflected light when the warning light is at least partially obscured. Then, a control circuit may disable a camera or other recording or capture device for as long as the obscuring continues, and/or may take other actions in response to the detected obscuring. In this way, it becomes difficult or impossible to record bystanders without their knowledge and awareness FIG. 1 is a block diagram of a device 102 with warning light thwart detection. In the example of FIG. 1, an operator 103 of the device 102 is in physical proximity to a bystander 104. As described in detail, below, the device 102 may be configured to respect and protect a privacy of the bystander 104 (or other bystanders), to comply with relevant privacy laws, and to otherwise facilitate intended use and enjoyment of the device 102.

The device 102 may include any suitable device that may benefit from the techniques described herein. For example, the device 102 may represent glasses, such as smartglasses, augmented reality (AR) glasses, or virtual reality (VR) glasses. More generally, the device 102 may represent any head-mounted device (HMD), including, e.g., a hat, helmet, or headband. Even more generally, the device 102 may represent any wearable or holdable device that may be configured to capture audio and/or visual recordings, including, e.g., a watch or smartphone.

In some example implementations, as shown in FIG. 1, the device 102 may include a frame 106. The frame 106 generally refers to a supporting, enclosing, and/or encasing member, which provides physical support for various components of the device 102, and which otherwise provides or facilitates features of the device 102. For example, in the context of various types of glasses or other HMDs, the frame 106 may support lenses of the glasses, and may include glasses arms to be positioned on the ears of the operator 103.

As just referenced, the frame 106 may also house, support, or otherwise facilitate use of, various components of the device 102. For example, the frame 106 is illustrated in FIG. 1 as including a recording device 108. The recording device 108 may represent, e.g., a camera. The recording device 108 may be configured, e.g., to record audio, images, and/or video. The recording device 108 may have many different components and aspects, including, e.g., lenses or microphones, that are not illustrated or described with respect to FIG. 1, for the sake of conciseness.

The recording device 108 may be integrated onto or within the frame 106 and/or the device 102, and may be small, discreet, and difficult to observe by the bystander 104. Accordingly, it may be technically feasible for the operator 103 to use the recording device 108 to record the bystander 104, without awareness of the bystander 104.

To prevent such outcomes, the frame 106 is illustrated as including a light source 110 that is activated when the recording device 108 is activated. Using various associated techniques, the light source 110 may thus provide a warning light 112 that is visible and viewable by the bystander 104.

For example, the light source 110 may include a light-emitting diode (LED). In example implementations, the frame 106 may include a light guiding element 114, which may represent one or more elements or structures used to provide light from the light source 110 as the warning light 112. For example, the light guiding element 114 may include a lightpipe designed to direct light from a source to a destination, as described in detail in conjunction with various example implementations, below. In other example implementations, the light guiding element 114 may include a beamsplitter, or may include one or more lenses. Other examples of light guiding element(s) 114 (including combinations thereof) are provided below, or would be apparent to one of skill in the art.

The warning light 112 may be provided through a surface 116 of the frame 106, and/or of the device 102. For example, the surface 116 may include an opening, space, or aperture through which the warning light 112 is visible. In other examples, the surface 116 may be partially or completely transparent, and the warning light 112 may be visible through the surface 116.

The warning light 112 may be configured to be easily noticeable by the bystander 104. For example, the warning light 112 may be configured to have a necessary size and/or brightness to alert bystanders within a field of view of the recording device 108 that the recording device 108 is in use. The warning light 112 may be configured to display a particular color, to blink, to increase in brightness, or to otherwise be noticeable, obvious, and conspicuous.

As described above, the operator 103 of the device 102 may seek to obtain an illicit, illegal, or undesired recording of the bystander 104, using the recording device 108. The operator 103 may thus be motivated to cover or obscure the warning light 112. For example, the operator 103 may place a finger, tape, or other obscuring object over the warning light 112, in an attempt to thwart the warning function of the warning light 112.

To detect and prevent such thwart attempts, the frame 106 may include a light sensor 118. For example, the light sensor 118 may represent a dedicated ambient light sensor (ALS) component. When the warning light 112 is at least partially obscured, e.g., by an obscuring object or material, the light sensor 118 may be positioned and configured to detect redirected light from the light source 110 that is redirected by the obscuring object or material. For example, the light sensor 118 may be configured to sense reflected or scattered light from the obscuring object or material. In various example implementations, one or more instances or types of the light guiding element 114 may be used to guide such reflected, scattered, or otherwise redirected light to the light sensor 118, in order to facilitate detection thereof. In such implementations, the light guiding element 114 directs light both from the light source 110 to the location of the warning light 112 on the surface 116 of the frame 106, and in a direction from the location of the warning light 112 on the surface 116 of the frame 106 toward the light sensor 118 when the warning light is at least partially obscured.

In response to detection of reflections by the light sensor 118, a device controller 120, e.g., a control circuit 122 thereof, may be configured to deactivate recording operations of the recording device 108, e.g., by deactivating the recording device 108, pausing the recording operations, or blocking transmissions of data from the recording device. The device controller 120 may be understood to represent any example of hardware and/or software elements suitable for use in controlling operations of the recording device 108, the light source 110, and the light sensor 118, detailed examples of which are provided below, e.g., with respect to FIG. 14. For example, the device controller 120 may be configured to automatically activate the light source 110 when the recording device 108 is activated by the operator 103.

For example, the control circuit 122 may include suitable comparison (e.g., comparator) and switching elements, implemented in hardware and/or software, and configured to analyze reflected light at the light sensor 118 to determine whether the warning light is at least partially obscured. In some example implementations, the device controller 120 and/or the control circuit 122 may include at least one processor, as well as suitable non-transitory computer-readable storage medium used to store instructions for processing by the at least one processor. When processed, the instructions may cause the device controller 120 (e.g., the control circuit 122) to, e.g., deactivate the recording device 108 when the warning light 112 is determined to be at least partially obscured, based on measurements of reflected light, as obtained from the light sensor 118.

Various options for implementing the control circuit 122 may depend on included hardware and other resources that may be available within, or accessible by, the device 102. For example, operations of the control circuit 122 may depend on a nature of the light source 110, the light sensor 118, the light guiding element 114, the device controller 120, and/or on a material and configuration of the frame 106, as described below in the various examples of FIGS. 3-11.

In additional examples, the device 102 may include a second light sensor 124, which may be positioned similarly to the light sensor 118 (e.g., may be in close proximity and facing in a same direction as the light sensor 118). Then, when the control circuit 122 detects a difference in ambient light detected at the light sensor 118 and the second light sensor 124, the difference may be attributed to the presence of an obstructing object that is at least partially obstructing the warning light 112. That is, the second light sensor 124 may be used to provide a reference, baseline, or expected level of ambient light.

The control circuit 122 may include a reflection threshold generator 126 configured to calculate a dynamic reflection threshold that takes into account, e.g., a current brightness of the light source 110, a preceding and/or baseline level of ambient light (as may be determined using the second light sensor 124), and/or natural crosstalk between the light source 110 and the light sensor 118 that may occur as a result of a design of the device 102 (e.g., as a result of relative placement of the light source 110 and the light sensor 118, and/or as a result of an implementation of the light guiding element 114).

In some examples, the dynamic reflection threshold may take into account a suitable margin of error sufficient to account for obstructions that are below a level of obstruction that may prevent the bystander 104 from being unaware of operation of the recording device 108. For example, such low-level obstructions may include a fingerprint, dirt, or other smudge that may inadvertently occur on the surface 116, without preventing a sufficient level of visibility of the warning light 112. More specific example operations of the control circuit 122 are provided below, e.g., with respect to FIGS. 12A and 12B.

The control circuit 122 may deactivate the recording device 108 using any suitable technique, and to any required extent, needed to protect the privacy and/or ensure the awareness of the bystander 104. For example, the control circuit 122 may turn the recording device 108 off. In other examples, the control circuit 122 may restrict a specific function of the recording device 108. Additionally, or alternatively, the control circuit 122 may be configured to cause the device 102 to make a specific noise, activate a second warning light or other warning indicator (not shown in FIG. 1), or otherwise issue a suitable warning to the bystander 104 that an attempted thwart of the warning function of the warning light 112 is in progress.

Accordingly, the bystander 104 may be confident that illicit recordings are not being captured. Consequently, adoption of the use of the device 102 of FIG. 1 may be facilitated as concerns over privacy violations are mitigated.

FIG. 1 provides a simplified illustration of the device 102 and the frame 106, encompassing many different types of example embodiments, some of which are illustrated below with respect to FIGS. 3-14. Thus, it will be appreciated that a positioning and configuration of the various components of the device 102 illustrated in FIG. 1 may be implemented in accordance with an overall design and implementation of the device 102.

For example, when the device 102 includes a HMD, such as smartglasses, and the recording device 108 includes a camera, then a viewing direction of the HMD, the camera, and the warning light 112 may be aligned. When the recording device 108 includes an option for audio-only capture, then the warning light 112 may be positioned at a location on the device 102 that may be determined to be mostly likely to be visible to the bystander 104 (for example, on a watch face when the device 102 includes a smartwatch).

Various components may be integrated within the frame 106, or within the device 102, or may be mounted thereon. In some implementations, one or more of the various components illustrated in FIG. 1 may be mounted on a different device, and may be in communication with the device 102.

Figure 2:
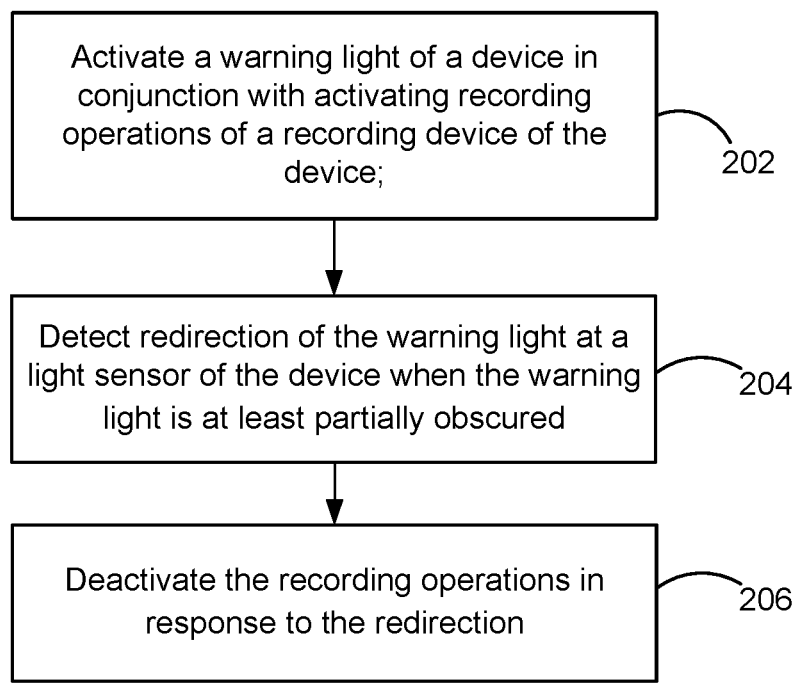
FIG. 2 is a flowchart illustrating example operations of the system of FIG. 1.

FIG. 2 is a flowchart illustrating example operations of the system of FIG. 1. In the example of FIG. 2, operations 202-206 are illustrated as separate, sequential operations. However, in various example implementations, the operations 202-206 may be implemented in a different order than illustrated, in an overlapping or parallel manner, and/or in a nested, iterative, looped, or branched fashion. Further, various operations or sub-operations may be included, omitted, or substituted.

In FIG. 2, a warning light 112 of a device 102 may be activated in conjunction with activating recording operations of a recording device 108 of the device (202). As referenced above, and described in more detail, below, the activating of the recording operations may include a request for initiation of the recording operations, and a granting of the request may be delayed until relevant thwart detection operations have confirmed that no thwart attempt is in progress. For example, the device controller 120, e.g., the control circuit 122, may be configured to detect an activation of (e.g., request for) the recording operations of the recording device 108 by the operator 103, and may be further configured to activate the warning light 112 in response to the activation of the recording device 108.

Figure 13:
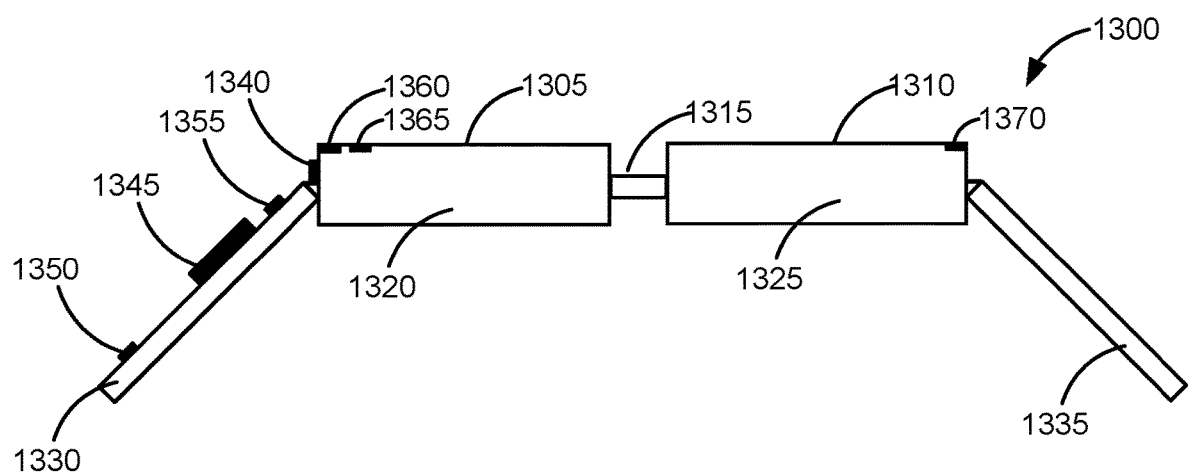
FIG. 13 illustrates an example pair of wearable glasses that may be used to implement the device of FIG. 1.

For example, as referenced above, the operator 103 may initiate operations of the recording device 108 using any suitable technique, e.g., using a button or touchscreen. Activation by the operator 103 may include a gesture or other motion of the operator 103, which may be detected by the device 102, or by another device (not shown) in communication with the device 102. For example, the device 102 may include smartglasses (as shown in FIG. 13), and the operator 103 may also utilize a smartwatch that detects a gesture of the operator 103 associated with activation of the recording device 108.

In various examples, the warning light 112 may be activated concurrently with, or prior to, the recording device 108. For example, the same gesture used to activate the recording device 108 may also activate the warning light 112. In some examples, the device controller 120 may activate the warning light 112 for a predetermined period of time prior to activating the recording device 108, so that the bystander 104 may be provided with time to react (e.g., object) to the initiation of a recording, and/or so that the thwart status of the warning light 112 may be determined.

The device controller 120 may be configured to maintain the warning light 112 as long as the recording device 108 is activated, e.g., recording. Thus, when the operator 103 chooses to deactivate the recording device 108, the device controller 120 may also deactivate the warning light 112, as well.

Redirection of the warning light may be detected at a light sensor 118 of the device 102 when the warning light 112 is at least partially obscured (204). For example, as described in detail, below, such redirected light (e.g., as detected at the light sensor 118) may be compared to a baseline level of reflected/scattered light (e.g., from the frame surface 116 or other parts of the device 102). Such a baseline level may include pre-determined components that may be determined, e.g., during a design of the device 102, as well as current components at a time that the recording device 108 is activated. For example, the light sensor 118 may include an ALS that continually detects ambient light in a vicinity of the device 102, or that is activated in conjunction with the activation of the recording device 108 and the light source 110.

The light sensor 118, perhaps in conjunction with a second light sensor 124, may be used to establish a baseline level of ambient light that is present prior to an activation of the recording device 108 and/or prior to a potential obstruction of the warning light 112. As referenced above, and described in detail below with respect to FIGS. 12A and 12B, the reflection threshold generator 126 may be configured to dynamically determine the threshold level of reflection needed to determine a presence of an obstruction with sufficient confidence. For example, the reflection threshold generator 126 may implement an algorithm that takes into account, e.g., a baseline level of ambient light, ambient light detected by the light sensor 118, expected cross talk between the light source 110 and the light sensor 118, and a suitable margin of error determined to minimize false positive and false negative detections of thwart attempts.

The recording operations may be deactivated in response to the redirection (206). For example, the control circuit 122 may be configured to deactivate the recording device 108. As referenced above, the control circuit 122 may be implemented in hardware and/or software. For example, the same algorithm and/or program used to dynamically determine the reflection threshold needed to cause deactivation of the recording device 108 may be used to implement the deactivation.

In example implementations, when an obstruction is detected prior to activation of the recording device 108, the recording device 108 may be deactivated to prevent initiation of a recording (e.g., image or video capture). In other examples, if a recording has already begun prior to the obstruction detection, the control circuit 122 may deactivate the recording device 108 while the recording is in progress.

Various additional or alternate actions may be taken or initiated by the control circuit 122, in conjunction with a potential or actual deactivation of the recording device 108. For example, the control circuit 122 may cause a speaker of the device 102 to issue an audible warning to the operator 103 and/or the bystander 104 that an obstruction of the warning light 112 has been detected and/or that the recording device 108 has been deactivated. For example, such warnings may be issued in case of an inadvertent obstruction, e.g., by the operator 103, rather than an actual thwart attempt.

In some implementations, the control circuit 122 may be configured to automatically re-activate the recording device 108 once an obstruction of the warning light has been removed. For example, if the light sensor 118 detects a lower level of reflection, determined to be below a reflection threshold determined by the reflection threshold generator 126, then the control circuit 122 may automatically reactivate the recording device 108, and/or may initiate an audible indication to the operator 103 that recording may recommence.

Figure 3:
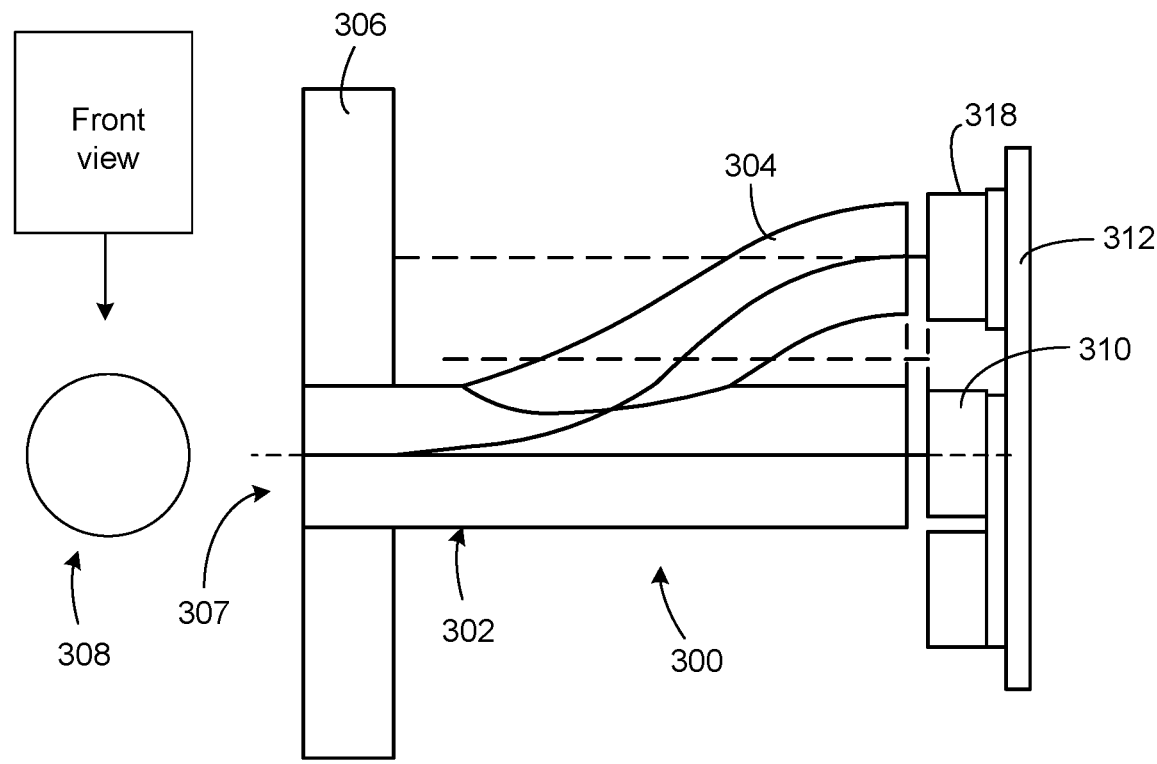
FIG. 3 illustrates a first example embodiment for use in the device of FIG. 1.

FIG. 3 illustrates a first example embodiment for use in the device of FIG. 1. In the example of FIG. 3, as well as in following examples of FIGS. 4-8, various types of lightpipes are used to implement the light guiding element 114 of FIG. 1. Such lightpipes may generally include any element(s) that direct light along a desired lengthwise direction, e.g., by using materials that enable internal reflection, including total internal reflection, of the transmitted light.

For example, lightpipes may be constructed using suitable glass or plastic materials, e.g., a solid transparent plastic material, or any material having a suitable index of refraction. A lightpipe may be implemented using an optical fiber. A lightpipe may be referred to using a different name, such as a light guide or a light channel.

A lightpipe need not be constructed in a straight or linear direction, and may be curved or bent to varying degrees. Consequently, a lightpipe allows and enables flexibility with respect to placement of the light source 110 and the light sensor 118 of FIG. 1, within a context of various particular implementations of the device 102, and as needed to enable fast and reliable operation of the control circuit 122.

In the example of FIG. 3, a lightpipe 300 includes a straight portion 302 and a curved portion 304. The lightpipe 300 is positioned between a frame surface 306 (having an opening 307 providing a front view 308 of the lightpipe 300), and a mounting surface 312 (e.g., a circuit board or other suitable surface). The frame surface 306 may be opaque, or may be partially or completely transparent.

As shown, a light-emitting diode (LED) 310, representing an example of the light source 110, is provided on the mounting surface 312, in proximity to an ALS 318, representing an example of the light sensor 118 of FIG. 1. Thus, as illustrated, the lightpipe 300 is constructed as a y-shaped lightpipe having a first opening facing the LED 310, a second opening facing the ALS 318, and a third opening (the opening of the front view 308) emitting the warning light.

In the example of FIG. 3, the straight portion 302 of the lightpipe 300 is substantially centered on the LED 310, while the curved portion 304 is substantially centered on the ALS 318. In other examples, the straight portion 302 of the lightpipe 300 may be substantially centered on the ALS 318, while the curved portion 304 may be substantially centered on the LED 310. Further in FIG. 3, the frame surface 306 includes the previously-mentioned opening 307, which may be sized and fitted to accommodate the straight lightpipe portion 302.

Figure 4:
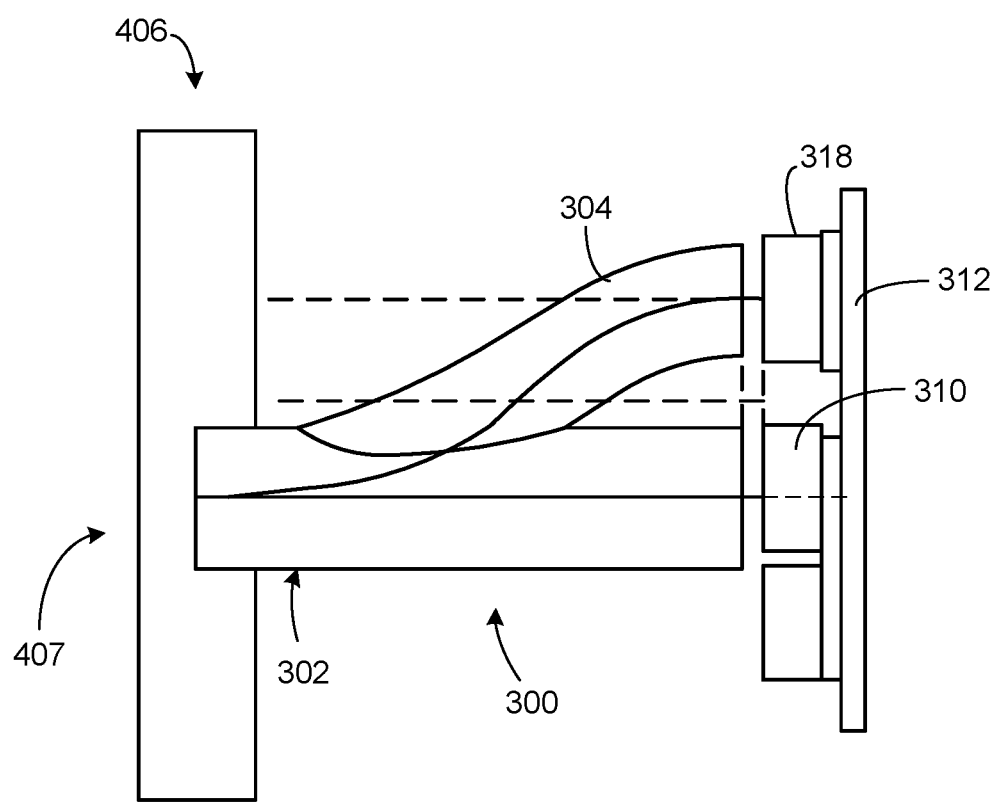
FIG. 4 illustrates a second example embodiment for use in the device of FIG. 1.

In alternative examples illustrated in FIG. 4, a frame surface 406 may be sufficiently transparent to enable light from the LED 310 to be emitted as a warning light at a location 407 of the frame surface 406. In such examples, as shown, it is not necessary to include an opening in the frame surface 406.

Figure 5:
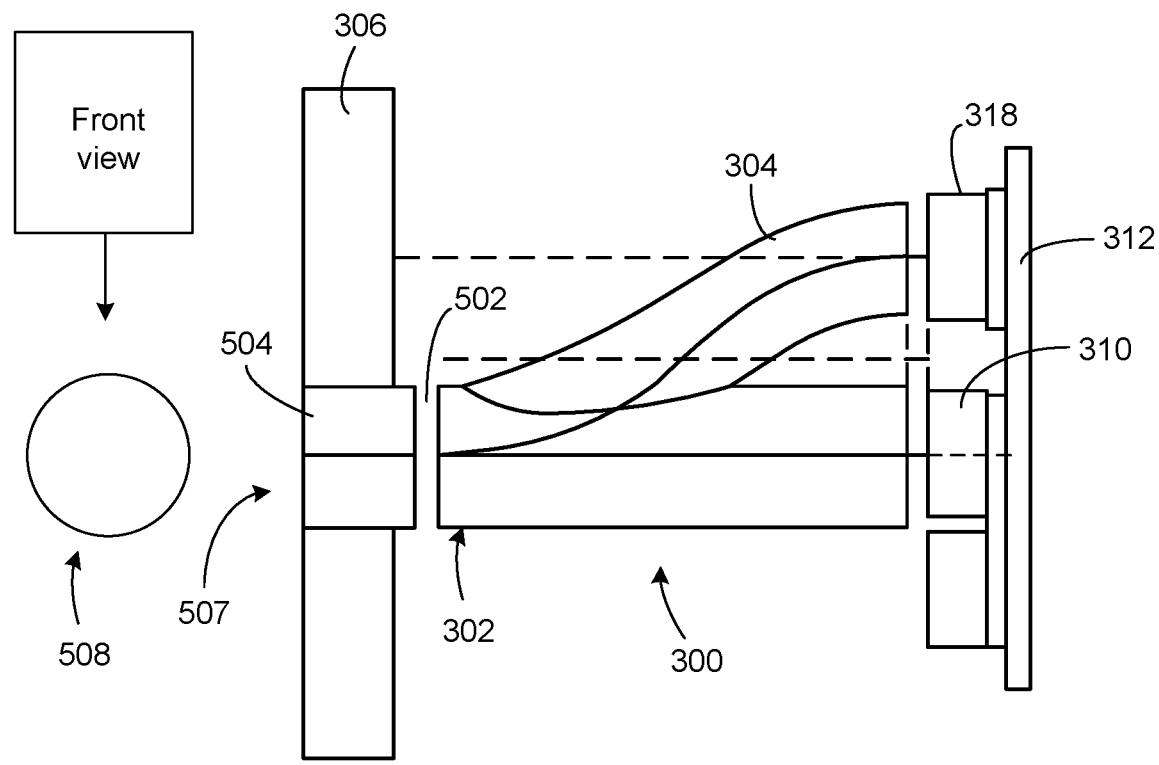
FIG. 5 illustrates a third example embodiment for use in the device of FIG. 1.

In an alternative example of FIG. 5, the frame surface 306 may be used, here with an opening 507 defining a front view 508 very similar to the front view 308 of FIG. 3. In FIG. 5, however, as shown, a gap 502 is provided between the straight lightpipe portion 302 and a separated lightpipe portion 504. In various examples implementations, the gap 502 may represent an air gap, or may include (be filled with) a suitably transparent material.

In FIG. 5, the separated lightpipe portion 504 may have be center-aligned with the straight lightpipe portion 302 and with the LED 310. The lightpipe 300 may be encapsulated in suitable molding or other material designed to maintain the center alignment between the straight lightpipe portion 302 and with the LED 310.

Figure 6:
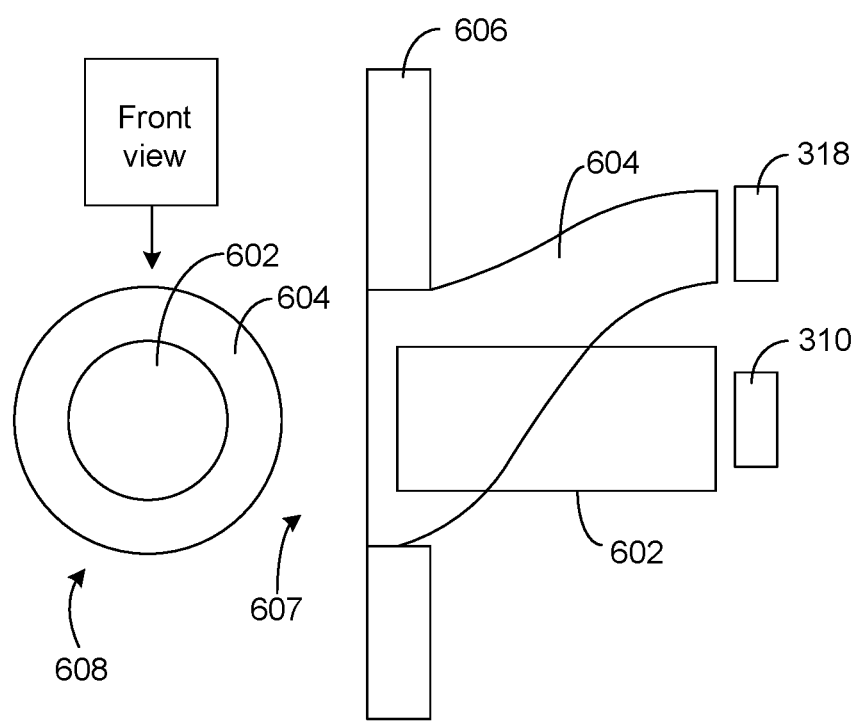
FIG. 6 illustrates a fourth example embodiment for use in the device of FIG. 1.

FIG. 6 illustrates an additional alternative embodiment, in which a substantially straight tube or rod 602 is center-aligned with the LED 310. For example, the rod 602 may include a glass rod, e.g., a metallized glass rod.

A separate, curved ALS lightpipe 604 may be formed using over-molded plastic or other suitable material. Similar to FIGS. 3 and 5, an opening 607 may be formed in a frame surface 606, thereby defining a front view 608. The curved ALS lightpipe 604 may also be metalized in some implementations. As shown, the rod 602 may be inserted through, and/or may protrude into, the curved ALS lightpipe 604. Metallization of a portion of the rod 602 within the curved portion 304 of the ALS lightpipe may be omitted partially or completely if such metallization interferes with or adversely affects detection of reflections when the opening 607 is obscured.

Figure 7:
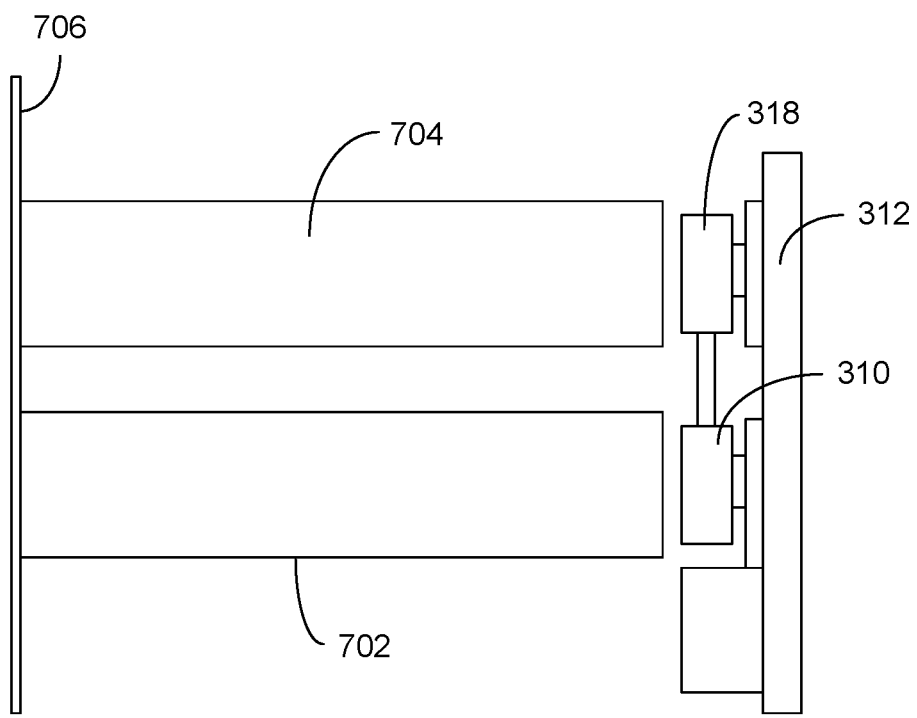
FIG. 7 illustrates a fifth example embodiment for use in the device of FIG. 1.

FIG. 7 illustrates an embodiment in which an LED lightpipe 702 is parallel to, and separate from, an ALS lightpipe 704. A frame surface 706 may be implemented to provide a warning light using suitable ones of the techniques described above with respect to FIGS. 3-6. For example, although not separately illustrated in FIG. 7, one or more openings may be provided in the frame surface 706, and/or the frame surface 706 may be partially or completely transparent.

Figure 8:
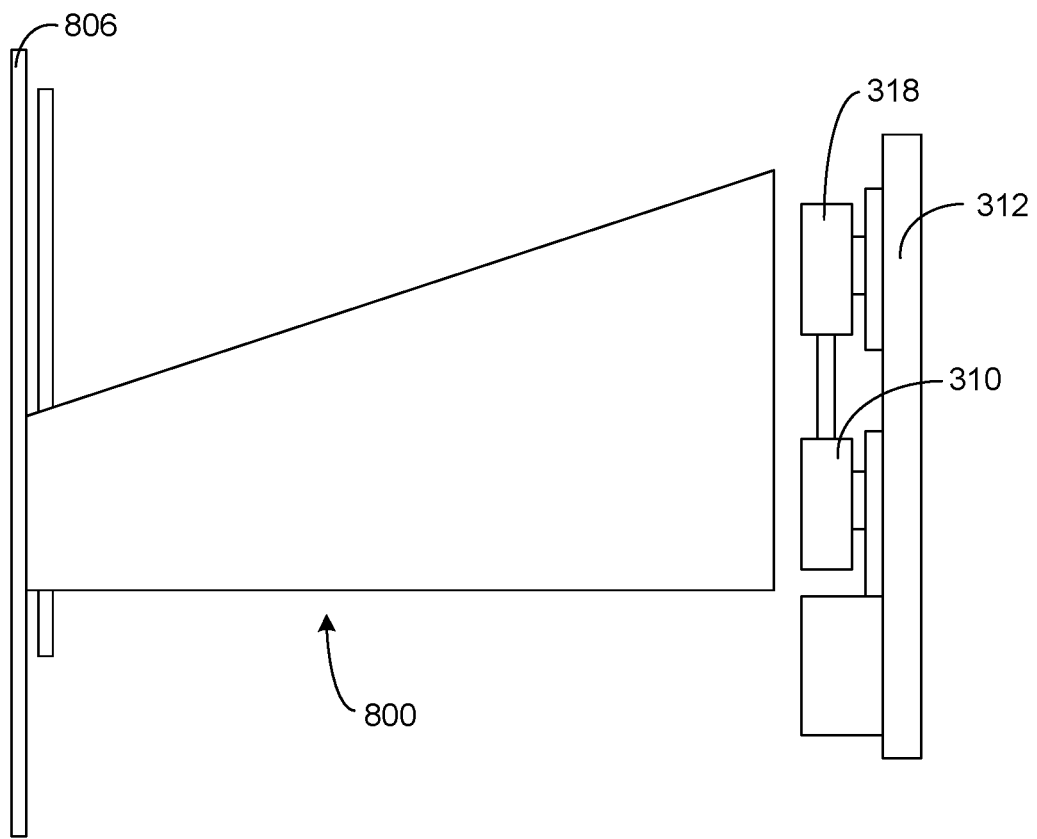
FIG. 8 illustrates a sixth example embodiment for use in the device of FIG. 1.

FIG. 8 illustrates an example embodiment that is similar to FIG. 7, but has a singular lightpipe 800 that expands in a direction from a frame surface 806 towards the LED 310 and the ALS 318. As with the frame surface 706, one or more openings may be provided in the frame surface 806, and/or the frame surface 806 may be partially or completely transparent.

Figure 9:
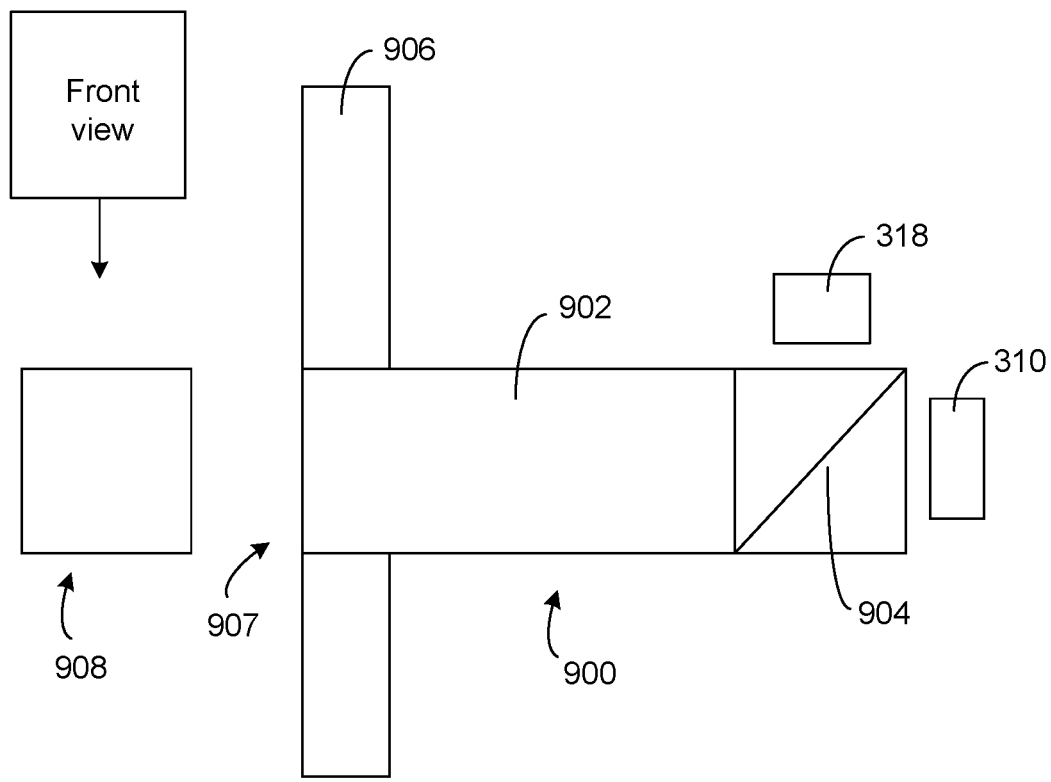
FIG. 9 illustrates a seventh example embodiment for use in the device of FIG. 1.

In FIG. 9, a lightpipe 900 is substantially square or rectangular in shape, resulting in a corresponding square or rectangular shape of a front view 908. A portion 902 is configured to direct light, and a beamsplitter 904 is included within a distal end of the lightpipe 900 with respect to a frame surface 906. In other examples, the beamsplitter 904 may be included in a proximal end of the lightpipe 900 with respect to the frame surface 906.

As shown, the LED 310 and the ALS 318 are arranged perpendicularly to one another, and the beamsplitter 904 is positioned to separate light traveling to and from the portion 902. For example, light traveling from the LED 310 may be used to provide a warning light, and the beamsplitter 904 may serve to minimize cross talk between the LED 310 and the ALS 318 when providing the warning light. Additionally, the beamsplitter 904 may serve to split any returning or otherwise redirected light from an obstructing object, for improved detection thereof by the ALS 318, using the techniques described herein.

Figure 10:
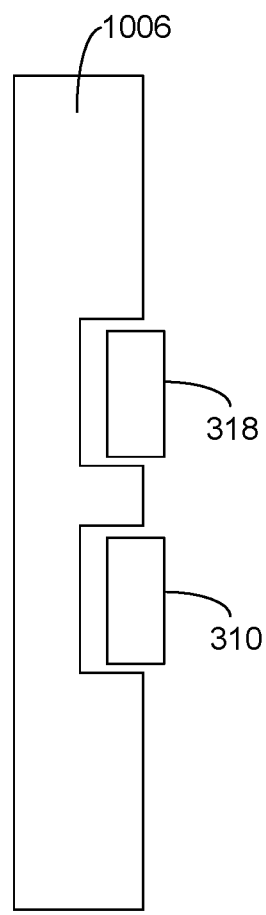
FIG. 10 illustrates a eighth example embodiment for use in the device of FIG. 1.

In FIG. 10, the LED 310 and ALS 318 are illustrated as being positioned, mounted, or encased within a frame surface 1006. Similar to the example of, e.g., FIG. 4, the frame surface 1006 may be sufficiently transparent to enable visibility of the LED 310 as the warning light. The LED 310 and the ALS 318 may be positioned sufficiently close to one another to ensure that any obstruction of the LED 310 will cause reflection of light from the LED 310 that is detectable by the ALS 318.

Figure 11:
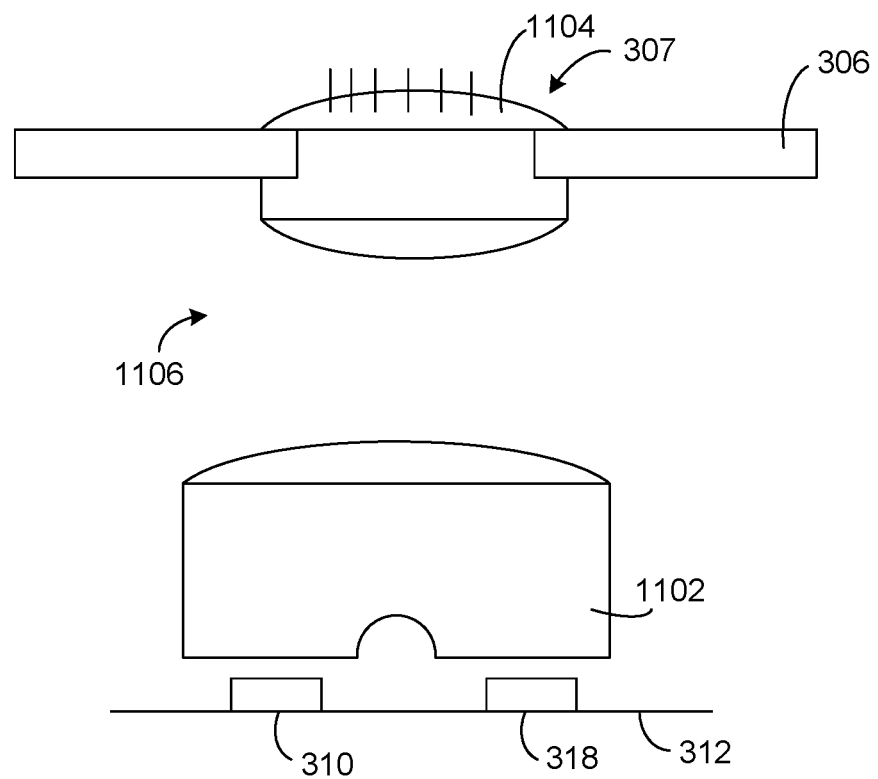
FIG. 11 illustrates a ninth example embodiment for use in the device of FIG. 1.

FIG. 11 illustrates a similar example structure as FIG. 3, with a frame surface 306 having an opening 307 therein, and with a mounting surface 312 used to mount the LED 310 and the ALS 318. In FIG. 11, however, the light guiding element 114 is implemented using a lens 1102 and a lens 1104, separated by a space 1106. In FIG. 11, the lenses 1102, 1104 and the space 1106 may be configured and arranged so that light from the LED 310 is directed and focused at the lens 1104 to provide a suitable warning light, while also ensuring that light reflected as a result of the lens 1104 being at least partially obstructed reaches the ALS 318.

The example implementations of FIGS. 3-11 are for purposes of illustration, and are neither limiting nor exhaustive. Many of the features of the various example implementations, and other features, may be combined with one another to provide additional implementations. In all such implementations, further optimizations may be made that are dependent upon other aspects of particular use case scenarios. For example, the various lightpipes may have lengths, diameters, shapes, or materials that are selected to conform with particular use case scenarios, such as in implementations of the types of smartglasses described below with respect to FIG. 13

Figure 12A:
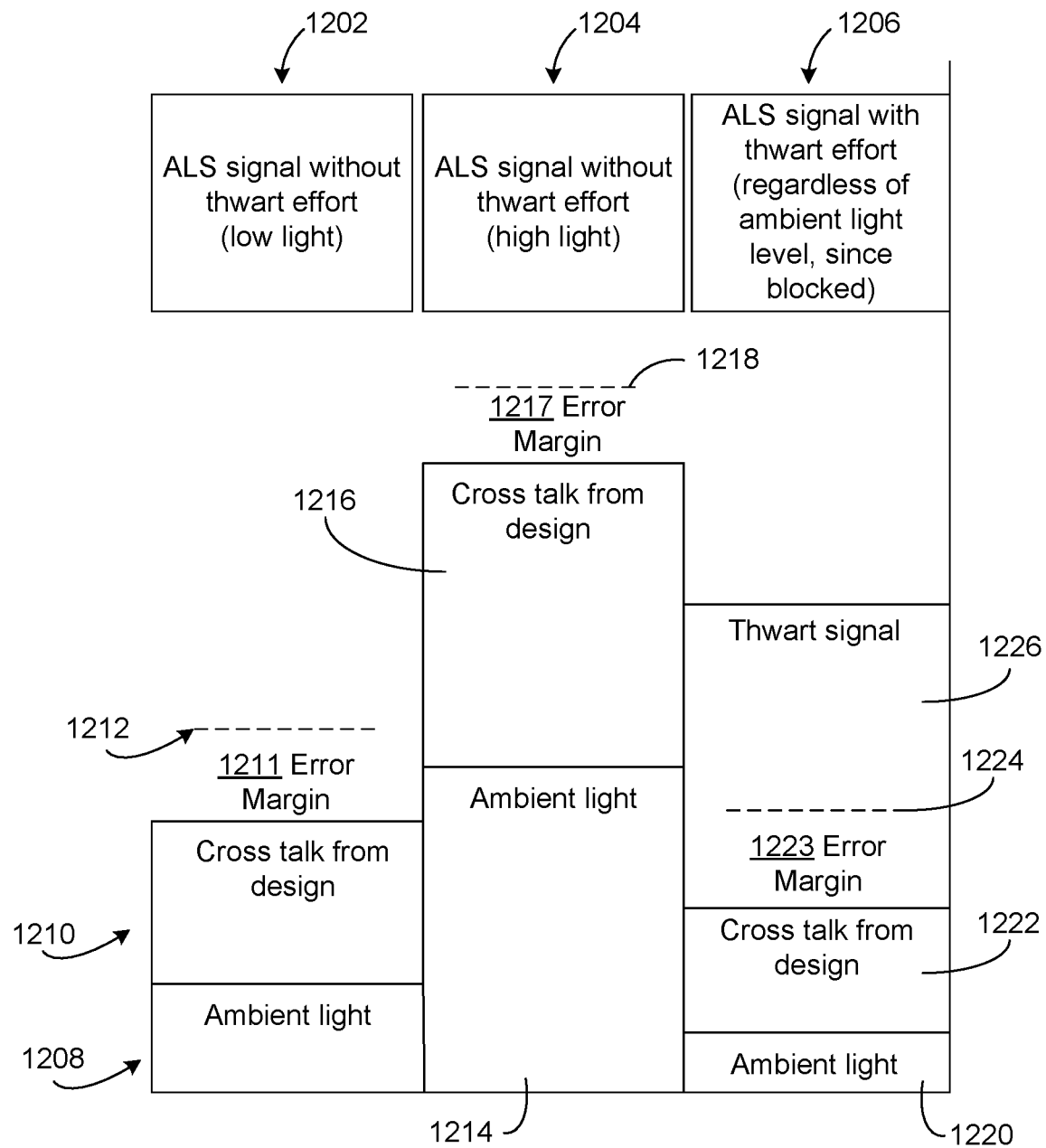
FIG. 12A is a block diagram illustrating example scenarios of implementations of the device of FIG. 1, using dynamic threshold generation.

FIG. 12A is a block diagram illustrating example scenarios of implementations of the device of FIG. 1, using dynamic threshold generation. In FIG. 12A, light intensity is measured in a vertical direction, and three scenarios are illustrated as scenario 1202, scenario 1204, and scenario 1206.

In scenario 1202, ambient light 1208 is determined to be at a first level, and cross talk 1210 is determined to be present. An error margin 1211 is included to determine a reflection threshold 1212. Thus, as shown, a sum of the ambient light 1208, the cross talk 1210, and the error margin 1211, is below the reflection threshold 1212, so that no thwart effort or condition is determined to exist in this scenario. For example, ambient light 1208 may be determined prior to, or in the absence of, activation of an LED being used. Both the cross talk 1210 and the error margin 1211 may be determined during a calibration step that may occur prior the current potential thwart detection. As described in detail, below, the cross talk may be characterized as multiple levels of cross talk that correspond to multiple brightness levels of the LED.

For example, in scenario 1204, ambient light 1214 is determined to be at a first level, and cross talk 1216 is determined to be present. An error margin 1217 is included to determine a reflection threshold 1218. Thus, as shown, a total ALS signal, including the ambient light 1214 and the cross talk 1216, when considering the error margin 1217, is below the reflection threshold 1218, so that no thwart effort or condition is determined to exist in this scenario.

In comparing scenario 1204 with scenario 1202, the ambient light 1214 is higher than the ambient light 1208, and the cross talk 1216 is higher than the cross talk 1210. For example, the scenario 1202 may occur in a relatively low-light scenario, such as in a dimly-lit room, or in the evening, and/or the scenario 1204 may occur in a relatively bright light scenario, such as in a well-lit room, or in sunny conditions.

In some example implementations of FIGS. 3-11, an intensity of the LED 310 may be adjusted in response to ambient light conditions. For example, when ambient light is low, the LED 310 may also be configured to provide a relatively low intensity. Conversely, when ambient light is higher, the LED 310 may be configured to provide a relatively high intensity. Such approaches may ensure visibility of the LED 310 in all conditions, while ensuring that the LED 310 is not so bright in low-light conditions that it causes a distraction or disrupts normal functioning of a corresponding camera.

Therefore, as may be observed in the example scenario 1204, an increase in ambient light 1214 may be correlated with an increase in the cross talk 1216, as compared to the ambient light 1208 and the cross talk 1210 of the scenario 1202. Consequently, even though the total ALS signal in scenario 1204 may be significantly higher than in the scenario 1202, and higher than the threshold 1212 of the scenario 1202, no thwart attempt may be detected.

In contrast, in the scenario 1206, the detected ambient light 1220 is lower than the ambient light 1208 of the scenario 1202 (because, in the example, the opening in the front is covered, so that there is almost no signal for the ALS to detect), and cross talk 1222 is lower than the cross talk 1210 (because, in the example, for the low ambient light detected 1220, the LED is set to its lowest brightness, and consequently the expected cross talk is lower). Consequently, and when considering an error margin 1223, a reflection threshold 1224 is lower than the threshold 1212, but a thwart signal 1226 indicating a thwart attempt is detected.

Figure 12B:
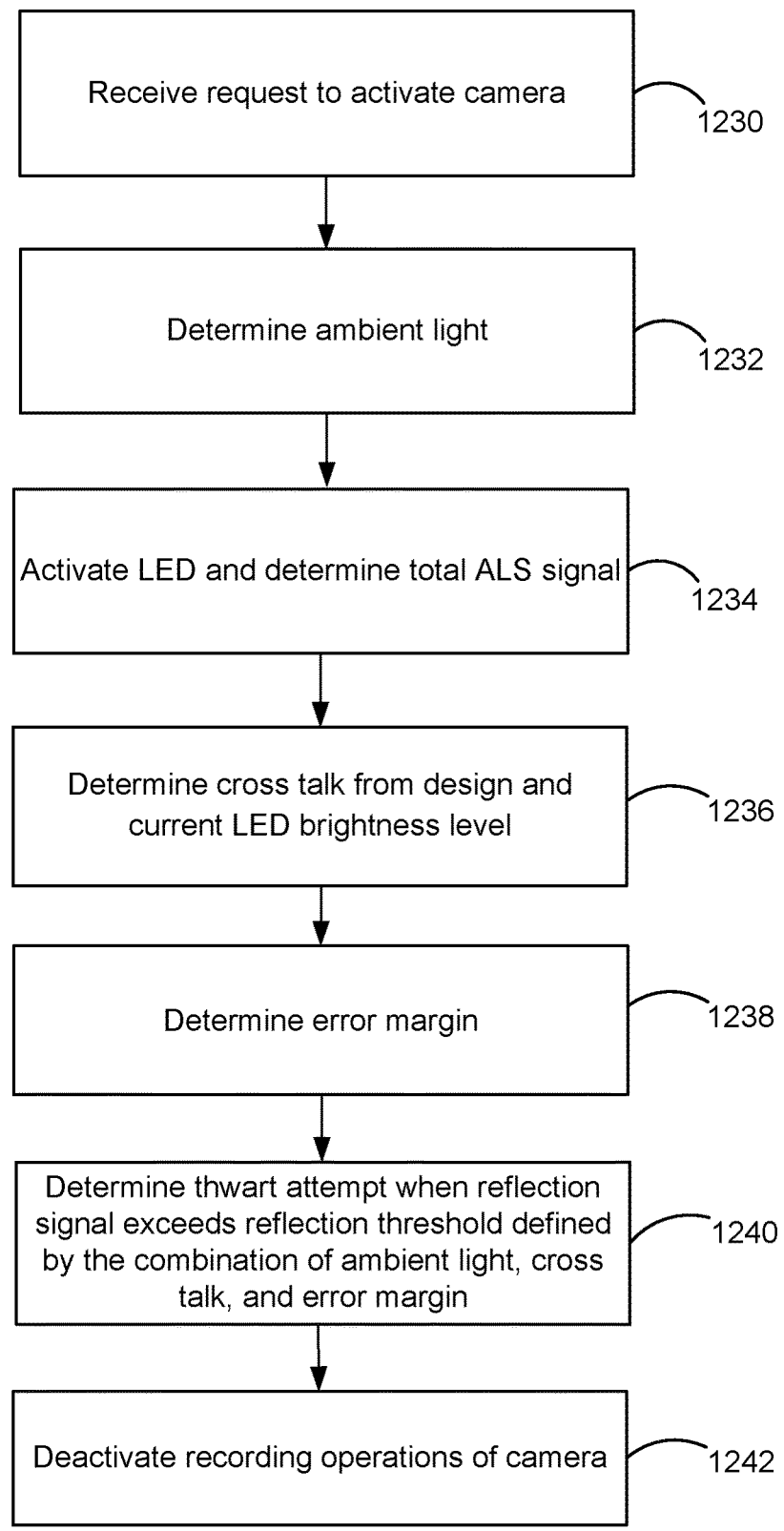
FIG. 12B illustrates a process flow according to the example embodiments of FIG. 12A.

FIG. 12B illustrates a process flow according to the example embodiments of FIG. 12A. In the example of FIG. 12B, a request to activate a camera may be received (1230).

A current level of ambient light may be determined (1232). For example, the current level of ambient light may be determined while the LED is off (e.g., prior to activation or while in an off state of a blinking configuration). A total ALS signal may be determined in conjunction with activation of the LED (1234). For example, a predetermined cross talk level may be assigned for the LED at any particular brightness setting. Then, the determined ambient light level may be used to determine which brightness level to use for the LED (e.g., bright enough to be visible but not so bright as to be distracting). The resulting brightness level may be used to determine a corresponding level of cross talk to be expected, using the predetermined cross talk levels (1236).

Determinations of ambient light and cross talk may be made in real time, perhaps leveraging additional, external measurements, and/or may also leverage prior measurements or calculations. For example, as referenced above with respect to the second light sensor 124 of FIG. 1, and as illustrated in more detail in the example of FIG. 13, below, a second ALS may be available. The second ALS may be positioned to be unaffected by cross talk from the LED, and to provide a true measure of ambient light. In such cases, the ALS signal may be compared to the second ALS signal to determine an expected ambient light at the ALS.

Both the ambient light determination and the cross talk determination may be enhanced through the use or prior measurements, calculations, compensations, or calibrations. For example, a correlation or relationships between light from the LED and the ALS signal may be determined for each example implementation of FIGS. 3-11, under controlled conditions when the actual level of ambient light is known. In other examples, either the ALS or the second ALS may be calibrated to account for a degree of transparency of a frame or frame surface of a particular device being used.

In some cases, the ambient light may be determined using the same or single ALS, when the LED is not activated (e.g., either prior to the LED activation, or while the LED is off if the LED is blinking). The LED current desired for the determined ambient light level may be determined, so that the corresponding, anticipated cross talk may also be determined. That is, as noted above with respect to FIG. 12A, increased ambient light may lead to increased LED current, which may lead to increased levels of cross talk.

Many other example implementations are possible for determining and distinguishing ambient light and cross talk levels. For example, various combinations of the above examples may be used. For example, the ambient light level may be determined using the ALS and the second ALS in combination (e.g., comparison) with one another. For example, if a thwarting material is very absorbent, a total ALS signal including the thwart signal might be very low, so that the second ALS may be useful in accurately determining an actual ambient light level.

In other examples, the camera itself may provide a de facto second ALS. For example, an exposure value (EV) of the camera, which combines a current aperture and shutter speed of the camera into a single number representing an amount of light in a scene, may be used to determine a level of ambient light.

In still other examples, the ALS may have multiple color channels, and/or the LED may be capable of generating multiple colors. In these cases, colors and color channels may be leveraged to enhance an accuracy of ambient light and/or cross talk determined.

An error margin may be determined (1238). Similar to the examples above, the error margin may be determined in real time and/or using prior measurements or calculations. For example, with respect to the various example implementations of FIGS. 3-11, the error margin may be dependent upon the implementation being used. For each such implementation, and other implementations, the error margin may depend upon various other known factors, such as, e.g., a length or a diameter of a lightpipe, characteristics of a beamsplitter, characteristics of the LED and/or the ALS being used, and a degree of transparency of a frame of a device being used.

The error margin may also be dependent on values of the LED brightness and/or ALS signal, at a time of activation of the LED. The error margin may also be dependent on various design choices. For example, a designer choosing a small error margin may seek to be particularly cautious in ensuring that no thwart attempts take place, even though such an approach may be more likely to lead to spurious or unnecessary deactivations of the camera.

Accordingly, a thwart attempt may be determined when a reflection signal exceeds a dynamic reflection threshold defined by a combination of the measured ambient light, expected cross talk (as determined from, e.g., calibration settings and a current level of LED brightness), and error margin (1240). As described above, the reflection threshold may be determined with respect to a reference, baseline, or expected level of ambient light, which may be determined, e.g., from the ALS (e.g., determined while the LED is off or blinking, or determined from a measurement taken prior to the potential thwart attempt), from a second ALS, or from an EV of a camera being used.

Upon determination of a thwart attempt, recording operations of the camera may be deactivated (1242), or may be prevented from being activated. As noted above, additional measures may also be taken to alert a bystander of the attempted thwart attempt, such as providing audible alerts. The camera may be re-activated as soon as no current thwart attempt is detected (e.g., when the LED is on covered).

Using the techniques of FIGS. 12A and 12B, it is possible to calibrate and optimize a device, such as the device 102 of FIG. 1, to avoid excessive false positive results, where false positive results refer to detected thwart attempts, and associated deactivations of a recording device, when no actual thwart attempt has occurred and/or no actual warning light obstruction has occurred. At the same time, the techniques of FIGS. 12A and 12B may be used to avoid false negatives, in which an actual thwart attempt occurs and is not detected.

FIG. 13 illustrates an example pair of wearable glasses 1300 that may be used to implement the device of FIG. 1. Wearable glasses 1300 may include lens frame 1305, lens frame 1310, center frame support 1315, lens element 1320, lens element 1325, extending side-arm 1330, extending side-arm 1335, image capture device 1340 (e.g., a camera), on-board computing system 1345 (which may include, or utilize, a touch input feature, such as a touchpad), speaker 1350, and microphone 1355.

Each of the frame elements 1305, 1310, and 1315 and the extending side-arms 1330, 1335 can be formed of a solid structure of plastic and/or metal, or can be formed of a hollow structure of similar material so as to allow wiring and component interconnects to be internally routed through the wearable glasses 1300. Other materials can be possible as well. At least one of the lens elements 1320, 1325 can be formed of any material that can suitably display a projected image or graphic. Each of the lens elements 1320, 1325 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The center frame support 1315 and the extending side-arms 1330, 1335 are configured to secure the wearable glasses 1300 to a user's face via a user's nose and ears, respectively. The extending side-arms 1330, 1335 can each be projections that extend away from the lens-frames 1305, 1310, respectively, and can be positioned behind a user's ears to secure the wearable glasses 1300 to the user. The extending side-arms 1330, 1335 can further secure the wearable glasses 1300 to the user by extending around a rear portion of the user's head. Additionally, or alternatively, for example, the wearable glasses 1300 can connect to or be affixed within a head-mounted helmet structure. Other configurations for wearable glasses are also possible.

The on-board computing system 1345 is shown to be positioned on the extending side-arm 1330 of the wearable glasses 1300; however, the on-board computing system 1345 can be provided on other parts of the wearable glasses 1300 or can be remotely positioned from the wearable glasses 1300 (e.g., the on-board computing system 1345 could be wire- or wirelessly-connected to the wearable glasses 1300). The on-board computing system 1345 can include a processor and memory, for example. The on-board computing system 1345 can be configured to receive and analyze data from the image capture device 1340 (and possibly from other sensory devices) and generate images for output by the lens elements 1320, 1325.

The image capture device 1340 can be, for example, a camera that is configured to capture still images and/or to capture video. In the illustrated configuration, image capture device 1340 is positioned on the extending side-arm 1330 of the wearable glasses 1300; however, the image capture device 1340 can be provided on other parts of the wearable glasses 1300. The image capture device 1340 can be configured to capture images at various resolutions or at different frame rates. Many image capture devices with a small form-factor, such as the cameras used in mobile phones or webcams, for example, can be incorporated into an example of the wearable glasses 1300.

One image capture device 1340 is illustrated. However, more image capture devices can be used, and each can be configured to capture the same view, or to capture different views. For example, the image capture device 1340 can be forward facing to capture at least a portion of the real-world view perceived by the user. This forward-facing image captured by the image capture device 1340 can then be used to generate an augmented reality where computer generated images appear to interact with or overlay the real-world view perceived by the user.

Wearable glasses 1300 can be used to (e.g., the on-board computing system 1345) interpret certain gestures (e.g., by a wearer's hand or hands) as user input. For example, wearable glasses 1300 can capture hand gestures by analyzing image data from image capture device 1340, and initiate tasks that are defined as corresponding to certain gestures. Further, speaker 1350 and microphone 1355 can be used as input/output components. For example, the microphone 1355 can detect speech that can be used to supplement and/or modify the intent associated with the hand gesture. The speaker can be configured to output an audible signal that can be heard by the user. The audible signal can be associated with the task associated with the task(s) that are responsive to the hand gesture. For example, the audible signal can be a beep indicating a task has been completed.

In some implementations, the wearable glasses 1300 can determine a user's intent, such as an intent to capture an image or video using the image capture device 1340, as described herein. In some implementations, it should be noted that the wearable glasses 1300 may determine user's intent based on a combination of hand gestures and verbal commands from a digital assistant.

In FIG. 13, an LED 1360 and an ALS 1365 may provide the functions of the LED 310 and the ALS 318 of FIGS. 3-11, above. Further in FIG. 13, a second ALS 1370 may be included, corresponding to the second light sensor 124 of FIG. 1. As described in detail above, e.g., with respect to FIGS. 12A and 12B, the second ALS 1370 may be used to enable accurate determinations of ambient light in a vicinity of the wearable glasses 1300, so that a total ALS signal of the ALS 1365 may be accurately parsed to distinguish an ambient light signal from included cross talk between the LED 1360 and the ALS 1365.

The on-board computing system 1345 may be used to implement the device controller 120 of FIG. 1, including the control circuit 122 of FIG. 1. Accordingly, the wearable glasses 1300 may be configured to determine a dynamic reflection threshold that enables fast and accurate determinations of thwart attempts, so that the image capture device 1340 may be prevented from being used to capture unauthorized, illicit, or illegal content, or from otherwise violating bystander privacy rights.

Figure 14:
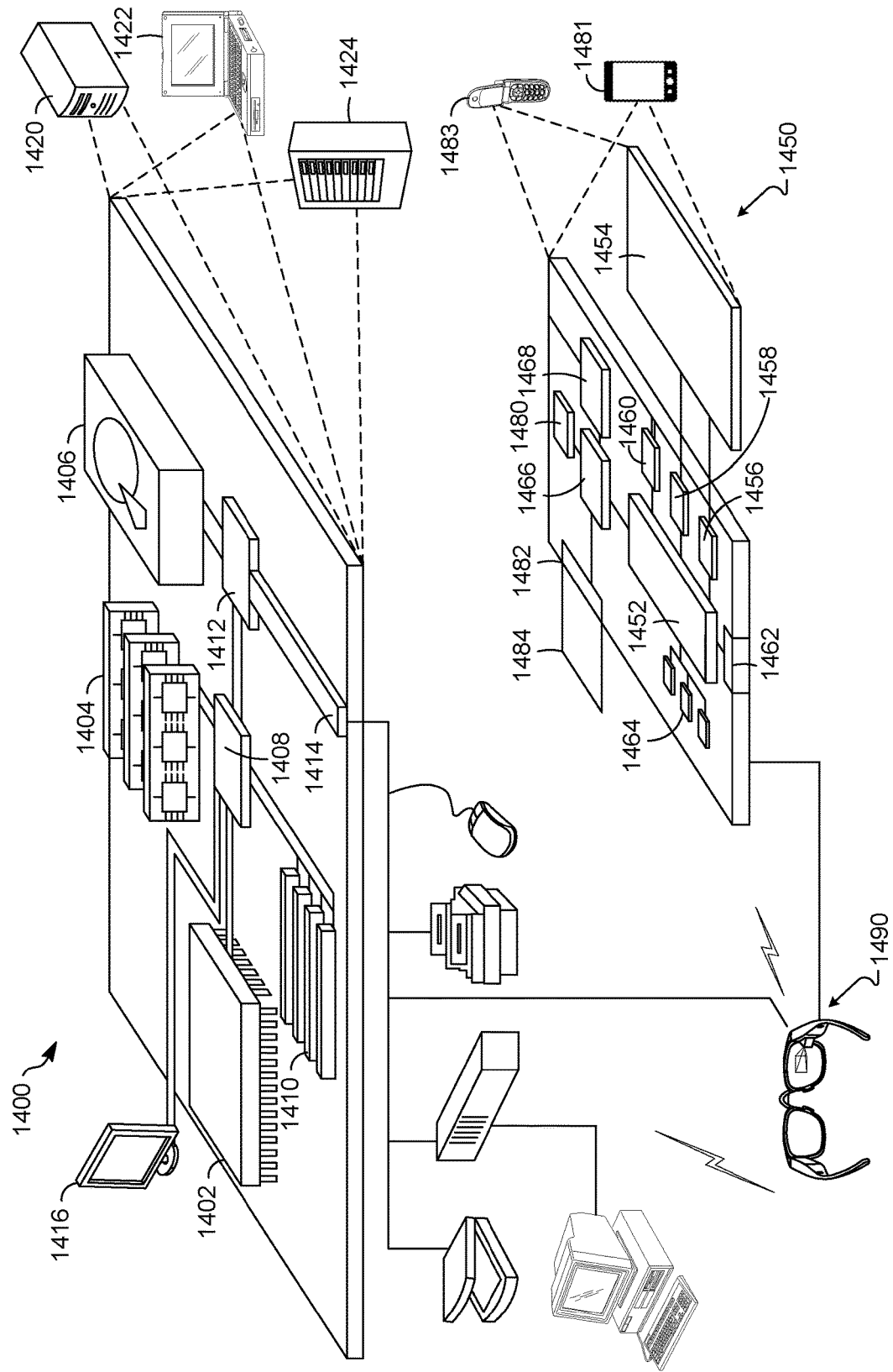
FIG. 14 shows an example of a computer device, mobile computer device and head mounted device according to at least one example implementation.

FIG. 14 shows an example of a computer device, mobile computer device and head mounted device according to at least one example implementation. In FIG. 14, computing device 1400 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. The processor 1402 can be a semiconductor-based processor. The memory 1404 can be a semiconductor-based memory. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk. In general, the computer-readable medium may be a non-transitory computer-readable medium.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1484 may also be provided and connected to device 1450 through expansion interface 1482, which may include, for example, a SIMM (Single In Line Memory Module) card interface. Such expansion memory 1484 may provide extra storage space for device 1450, or may also store applications or other information for device 1450. Specifically, expansion memory 1484 may include instructions to carry out or supplement the processes described above, and may include secure information also. Thus, for example, expansion memory 1484 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1484, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, low power Bluetooth, Wi-Fi, or other such transceiver (not shown). In addition, GPS (Global Positioning System) receiver module 1480 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1483. It may also be implemented as part of a smart phone 1481, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 14 can include sensors that interface with, or are included in, a HMD 1490. For example, one or more sensors included on computing device 1450 or other computing device depicted in FIG. 14, can provide input to HMD 1490 or in general, provide input to that can be used by the HMD 1490. The sensors can include, but are not limited to, a touchscreen, accelerometers, gyroscopes, pressure sensors, biometric sensors, temperature sensors, humidity sensors, and ambient light sensors. Computing device 1450 (e.g., the HMD 1490) can use the sensors to determine an absolute position and/or a detected rotation of the HMD 1490 that can then be used as input for use by the HMD 1490.

In some implementations, one or more input devices included on, or connected to, the computing device 1450 and/or the HMD 1490 can be used as inputs for use by the HMD 1490. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device.

In some implementations, one or more output devices included on the computing device 1450, and/or in the HMD 1490, can provide output and/or feedback to a user of the HMD 1490. The output and feedback can be visual, tactical, or audio. The output and/or feedback can include, but is not limited to, rendering a display of the HMD 1490, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, computing device 1450 can be placed within HMD 1490 to create an integrated HMD system. HMD 1490 can include one or more positioning elements that allow for the placement of computing device 1450, such as smart phone 1481, in the appropriate position within HMD 1490. In such implementations, the display of smart phone 1481 can render images using a display of the HMD 1490.

In some implementations, the computing device 1450 may appear as another object in a computer-generated, 3D environment. Interactions by the user with the computing device 1450 (e.g., rotating, shaking, touching a touchscreen, swiping a finger across a touch screen) can be interpreted as interactions with the object in the AR/VR space. As just one example, computing device can be a laser pointer. In such an example, computing device 1450 appears as a virtual laser pointer in the computer-generated, 3D environment. As the user manipulates computing device 1450, the user in the AR/VR space sees movement of the laser pointer. The user receives feedback from interactions with the computing device 1450 in the AR/VR environment on the computing device 1450 or on the HMD 1490.

In some implementations, a computing device 1450 may include a touchscreen. For example, a user can interact with the touchscreen in a particular manner that can mimic what happens on the touchscreen with what happens in a display of the HMD 1490. For example, a user may use a pinching-type motion to zoom content displayed on the touchscreen. This pinching-type motion on the touchscreen can cause information provided in display to be zoomed. In another example, the computing device may be rendered as a virtual book in a computer-generated, 3D environment.

In some implementations, one or more input devices in addition to the computing device (e.g., a mouse, a keyboard) can be rendered in a display of the HMD 1490. The rendered input devices (e.g., the rendered mouse, the rendered keyboard) can be used as rendered in the in the display.

A number of implementations have been described. Nevertheless, it will be understood that various modifications may be made without departing from the spirit and scope of the description and claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example implementations. Example implementations, however, may be embodied in many alternate forms and should not be construed as limited to only the implementations set forth herein.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 130 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present implementations.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A device comprising:
a frame;
a recording device;
a light source mounted to the frame and providing a warning light configured to be activated in conjunction with recording operations of the recording device;
a light sensor;
a light guiding element having an input positioned to receive light from the light source, a first output at a surface of the frame to provide the warning light, a second output directed at the light sensor, and a light guiding portion between the first output and both of the input and the second output, wherein the light guiding portion is configured to direct the warning light from the input to the first output and to direct redirected light from the first output to the second output and thereby to the light sensor when the first output is at least partially obscured at the surface of the frame; and
a control circuit configured to deactivate the recording operations in response to detection of the redirected light by the light sensor.

2. The device of claim 1, wherein the surface of the frame is at least partially transparent to enable visibility of the warning light.

3. The device of claim 1, wherein the light guiding element includes a lightpipe.

4. The device of claim 3, wherein the lightpipe has a y-shape with a first opening facing the light source as the input, a second opening facing the light sensor as the second output, and a third opening as the first output and emitting the warning light.

5. The device of claim 1, wherein the light guiding element comprises:
a substantially linear rod directing light from the light source and the input to the surface of the frame to be emitted as the warning light from the first output; and
a curved lightpipe having a first end at the first output and a second end facing the light sensor to provide the second output, wherein the substantially linear rod protrudes through the curved lightpipe.

6. The device of claim 1, wherein the light guiding element includes a beamsplitter.

7. The device of claim 1, wherein the recording device includes a camera and the device is a head-mounted device (HMD), and further wherein a viewing direction of the camera, the HMD, and the warning light are aligned.

8. The device of claim 1, wherein the control circuit is configured to determine a threshold based on a detected level of ambient light, and to deactivate the recording operations when the redirected light exceeds the threshold.

9. The device of claim 8, wherein the detected level of ambient light is determined using a second light sensor.

10. The device of claim 8, wherein the detected level of ambient light is determined using the light sensor during a time that the warning light is deactivated.

11. The device of claim 8, wherein the threshold is determined based on a level of ambient light detected by the light sensor and a level of cross talk between a light source of the warning light and the light sensor.

12. A computer program product, the computer program product being tangibly embodied on a non-transitory computer-readable storage medium and comprising instructions that, when executed by at least one computing device, are configured to cause the at least one computing device to:
activate a warning light of a device in conjunction with activating recording operations of a recording device of the device, the warning light being directed from a light source through a first input of a light guiding element, and through a light guiding portion to a first output of the light guiding element;
detect redirection of the warning light at the first output and through the light guiding portion to a second output directed at a light sensor of the device when the warning light is at least partially obscured;
determine a threshold based on a detected level of ambient light and a level of cross talk within the light guiding portion resulting from the redirection and the light source; and
deactivate the recording operations in response to the redirection when the threshold is exceeded.

13. The computer program product of claim 12, wherein the detected level of ambient light is determined using a second light sensor.

14. The computer program product of claim 12, wherein the detected level of ambient light is determined using the light sensor during a time that the warning light is deactivated.

15. A method comprising:
- activating a warning light of a device in conjunction with activating recording operations of a recording device of the device;
- directing the warning light from a light source mounted on a frame of the device through an input of a light guiding element and thereby to a light guiding portion for output at a first output at a surface of the frame;
- directing redirected light from the first output through the light guiding portion to a second output directed at a light sensor mounted to the frame, when the first output is at least partially obscured at the surface of the frame;
- detecting the redirected light from the second output at the light sensor; and
- deactivating the recording operations in response to the detecting of the redirected light by the light sensor.

16. The method of claim 15, wherein the light guiding element includes a lightpipe.

17. The method of claim 15, further comprising:
- determining a threshold based on a detected level of ambient light; and
- deactivating the recording operations when the redirected light exceeds the threshold.

\* \* \* \* \*